June 19, 1956 — E. E. BLOCK — 2,751,250
SPRINKLER GUARD
Filed July 18, 1955
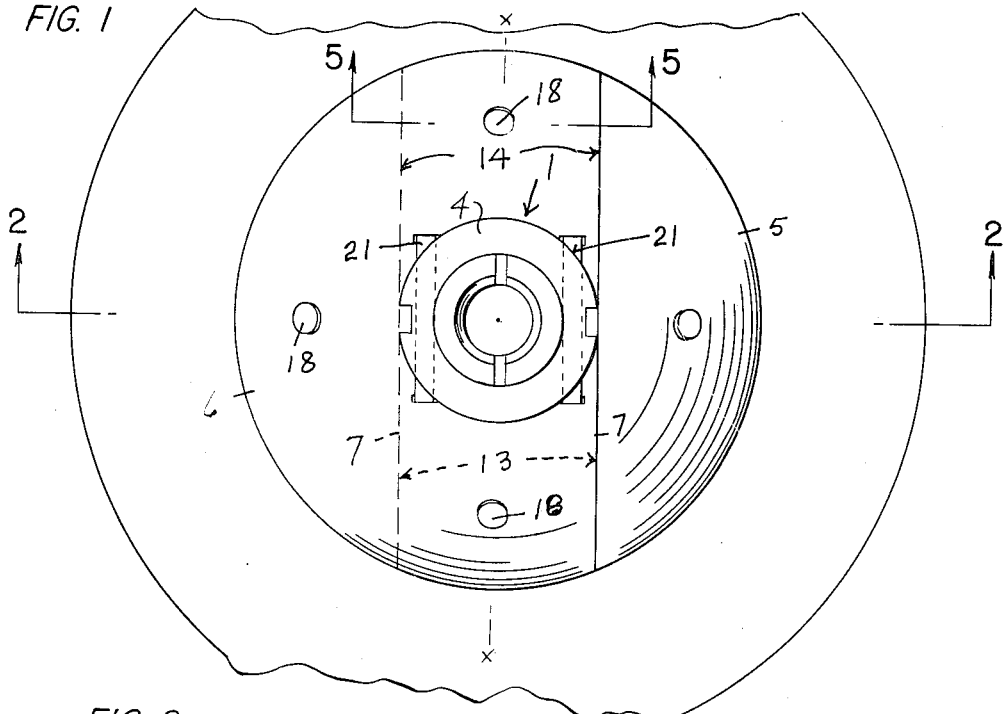
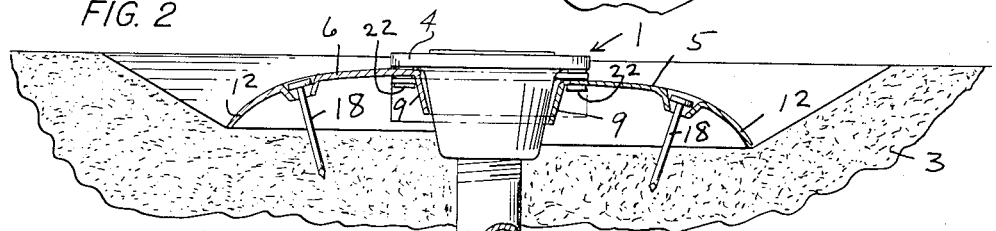
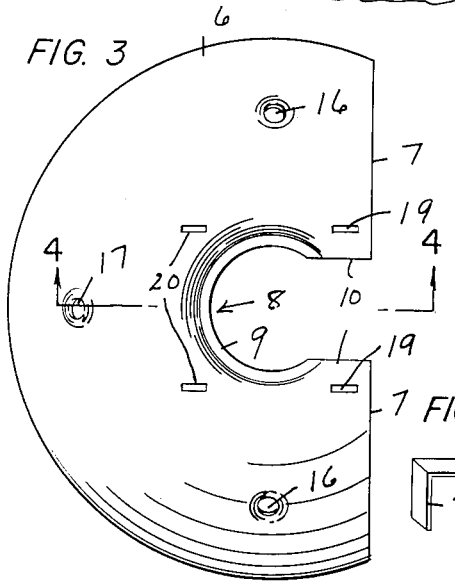
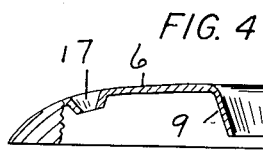
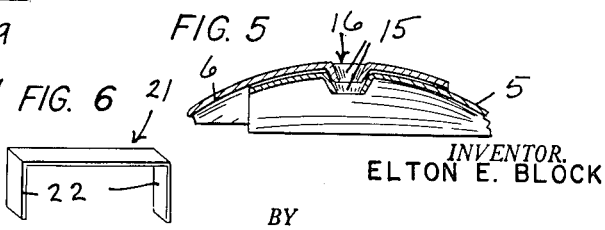
INVENTOR.
ELTON E. BLOCK
BY
Boyken, Mohler & Wood
ATTORNEYS

United States Patent Office 2,751,250
Patented June 19, 1956

2,751,250
SPRINKLER GUARD
Elton E. Block, San Francisco, Calif.
Application July 18, 1955, Serial No. 522,618
4 Claims. (Cl. 299—60)

This invention relates to a sprinkler guard for permanent lawn sprinklers of the type that are installed in lawns so as to be substantially flush with the upper surface of the ground in order not to interfere with or injure a lawn mower.

One of the main objections to sprinklers of the above type is that grass and weeds around them quickly interfere with the proper and efficient operation thereof. Since the dampest ground is usually adjoining or closely adjacent to each sprinkler head, the growth of grass and weeds is faster and more luxuriant there and this grass or weeds or both quickly overrun the head, requiring the gardener to frequently spend valuable time merely clearing the grass and weeds away from each head. The heads themselves may be of the type that include movable parts that are impaired in their action, or that are rendered inoperative by grass or weeds.

Several objects of the present invention are a sprinkler guard that is easily and quickly secured around an installed sprinkler head without requiring special tools and without in any way altering, adding to or removing from the conventional sprinkler head, and which guard will positively prevent the growth of weeds and grass around each head.

Another object of the invention is the provision of a sprinkler guard of the above type that will not interfere with the normal operation of a lawn mower, and one that will prevent the growth of weeds or grass that would otherwise interfere with the efficient operation of the sprinkler.

A still further object of the invention is the provision of a sprinkler guard for preventing the growth of grass and weeds immediately around a sprinkler head of the type mentioned above, and which guard is adapted for use with sprinkler heads that are positioned in an open lawn well spaced from sidewalks, roads, gutters or curbing, etc., and which guard is also constructed so that a portion thereof can be effectively used where the sprinkler heads are positioned so close to a cement walk, gutter, etc., that the entire shield cannot be used, and which portion will not interfere with the use of a conventional lawn edger used to trim grass that is along the edges of the sidewalk.

A still further object of the invention is the provision of a sprinkler guard of the general type hereinbefore described, that is adapted to be secured around a sprinkler head by simple and effective means that is effective for preventing removal or dislodgement by unauthorized persons.

An added object of the invention is the provision of a sprinkler shield that will drain water from the sprinkler head away from the same so that the normally excessive growth of grass and weeds that now occurs so close to the sprinkler head as to interfere with the efficient operation of the latter will not occur sufficiently close to the head as to interfere with its operation.

Other objects and advantages will appear in the description and in the drawings.

In the drawings, Fig. 1 is a top plan view of the sprinkler guard in combination with a sprinkler head.

Fig. 2 is a sectional view through the sprinkler guard taken along line 2—2 of Fig. 1; the sprinkler head itself being shown in elevation.

Fig. 3 is a top plan view of one-half of the sprinkler guard.

Fig. 4 is a fragmentary sectional view taken along line 4—4 of Fig. 3.

Fig. 5 is a fragmentary sectional view taken along line 5—5 of Fig. 1.

In detail, a conventional sprinkler head of the type with which the present guard may be used, is generally indicated at 1. Such a head is usually secured on the upper end of a water supply pipe 2 (Fig. 2), the latter extending vertically in the ground 3. The upper surface of the sprinkler head is about flush with the upper surface of the ground so that it will not injure a lawn mower nor be injured thereby, and so that it will not be obtrusive or be objectionable to persons walking over the lawn.

The sprinkler heads of the general type shown may vary, some having heads that move upwardly under water pressure for operation. The present invention is not restricted to any particular structure. It should be noted, however, that virtually all heads of the above general type have a horizontally extending flange or projection 4 therearound.

The sprinkler guard of the present invention comprises a pair of substantially semicircular plates 5, 6, each having a straight edge 7 that defines a chord line extending between the ends of the circular periphery of each plate, and these straight edges are positioned past a diametrically extending central line extending through the center about which the circular edges of said plates are formed so that said plates are actually slightly larger than semicircular plates.

Each plate 5, 6 is formed with a central recess 8 (Fig. 3) that opens laterally outwardly of the straight edge 7 centrally between the ends of the latter. These recesses are circular and a downwardly directed flange 9 that extends slantingly toward the vertical axis of each recess forms the sides thereof, while opposed parallel edges 10 (Fig. 3) extending perpendicularly to the edge 7 define the sides of the recess or the edges of a passageway leading into the recess from edge 7. These edges 10 are preferably spaced apart a slightly greater distance than the diameter of pipe 2, but less than the diameter of the head 1 below flange 4, and the diameter of the circular portion of recess 8 is almost equal to the diameter of the said head 1 below flange 4. Since flanges 9 taper toward the axis of the recess 8 in a downward direction, the flange 9 on one plate will nest within the flange 9 of the other plate, and when they are so nested, they will coact to form the sides of a continuous circular central opening (in horizontal cross sectional contour).

The outer marginal portions 12 (Fig. 2) of plates 5, 6 along their circularly extending edges extend downwardly to provide a down turned rim at the outer peripheries of the plates.

In installing the plates around a sprinkler head, the ground 3 should preferably be dug away a sufficient distance to enable the plates 5, 6 to be moved toward each other below the head 1 with the pipe 2 between the passageways 10 so that the marginal portions 13, 14 along edges 7 will move to lapping relation (Fig. 1) with edges 7 parallel. The plates are then moved vertically so that portions of the flange 9 and rim 12 of one plate will nest within adjacent portions flange 9 and rim 12 of the other plate. These portions constitute the parts that are within the lapping areas of the plates.

The plates 5, 6 may also be provided with downwardly directed projections 15 (Fig. 5) that are in the said marginal portions 13, 14 and that register with each other and fit together in nested relation. These projections may be burrs around small openings 16, and when so nested they prevent relative rotation between the plates.

Other small openings 17 may be provided in the plates for the passage of pins 18 therethrough and into the ground (Fig. 2).

As seen in Fig. 3, pairs 19, 20 of spaced slots may be formed in said plates adjacent to the central recesses therein and in the marginal portions 13, 14. The pair of slots 19 in plate 5 (Fig. 1) will register with the pair of slots 20 in the plate 6 and the pair of slots 19 in plate 6 will register with the pair of slots 20 in plate 5 when the plates are in nested relation as seen in Fig. 1.

An inverted generally U-shaped clip 21 (Fig. 6) having legs 22 is provided for releasably locking the plates together. One clip or preferably a pair of clips, are used for each pair of plates. The legs 22 of the clips extend through the pairs of openings in the plates, and they are then bent toward each other (or oppositely outwardly) below the lowermost plate of the two when the plates are in tight nested relation, thus locking the plates together.

Once the plates are locked together the operator elevates them so that flanges 9 snugly engage the sides of the head 1 below flange 4, and soil is then replaced below the plates to hold them elevated substantially against said head. The earth that was removed for installation of the plates is replaced (except above the plates) and the plates cannot be removed without digging a considerable hole below them to reach the bent legs 22 of the clips for bending them downwardly. Since the plates themselves must be lowered to the point where the pipe 2 will pass through the passageway 10 in each plate, it is seen that the likelihood of any unauthorized person doing all this work to merely remove a relatively cheap plate that has no value except for the purpose for which it is intended, is relatively small.

In some instances, the sprinkler heads are so close to curbs or walks that the two plates as seen in Fig. 1 cannot be used. In such circumstances only one plate is used with its straight edge 7 parallel with the curb or walk, and pins 18 driven through openings 16, 17 into the ground for holding the plate in position.

The plates 5, 6 may be made of any suitable material, although a weather and shock resistant plastic composition material or the like is preferable. Such material should not warp or corrode under the effects of the elements or temperature changes and should not be so brittle as to be easily broken.

Since the plates 5, 6 are identical in every respect, it is obvious that their installation is simple and their production is economical. Once installed, the sprinkler head is effectively guarded against the objectionable growth of weeds and grass for many years.

It is also pertinent to note that where the weeds and grass are kept away from the sprindler heads, there is little if any likelihood of insects entering the sprinkler heads to build nests or cocoons that would interfere with the operation of heads. Where the grass or weeds grow around the sprinkler heads as in the past, the said heads provide choice locations for the insect nests or cocoons since they are protected by the weeds and grass. When kept exposed, such heads are no longer attractive to such insects.

It is to be understood that the detailed description is not intended to be a limitation of the invention, but it is merely illustrative of a preferred form.

Several additional features that should also be noted are, that, with the present invention, there is no objectionable hole around the sprinkler head to fill with water and to overflow the latter thereby rendering the sprinkler inoperative; and the present invention also provides a hard, smooth surface directly around the head and close to its upper surface, thus preventing a person from tripping over the head.

I claim:

1. In a sprinkler head adapted to be secured on the upper end of an upstanding water supply pipe that is in the ground with said head in a position with its upper side approximately flush with the upper surface of the ground, a sprinkler guard comprising; a pair of generally horizontally disposed plates formed along one of their edges with opposedly opening recesses in which said head is fitted with its sides substantially in engagement with the sides of said recesses, said plates having one of their marginal portions extending oppositely away from said recesses in lapping relation, means on said plates for releasably securing them together against movement away from said head, said means including inverted U-shaped clips providing a pair of legs, openings in said plates in registration with each other, said legs extending through said openings from the upper sides of said plates and bent to angularly extending positions below said plates.

2. In a sprinkler head adapted to be secured on the upper end of an upstanding water supply pipe that is in the ground with said head in a position with its upper side approximately flush with the upper surface of the ground, a sprinkler guard comprising; a pair of generally horizontally disposed plates formed along one of their edges with opposedly opening recesses in which said head is fitted with its sides substantially in engagement with the sides of said recesses, said plates having one of their marginal portions extending oppositely away from said recesses in lapping relation, means on said plates for releasably securing them together against movement away from said head, said plates being generally semicircular and identical in every respect with said marginal portions being along straight edges defining the chords of semicircular pieces, said straight edges of each plate being positioned past a diametrically disposed center line extending through the center of said head to provide said lapping portions.

3. A sprinkler shield for a water sprinkler of the permanent type that is disposed in the ground with its upper side substantially flush with the upper surface of the ground comprising; a pair of identical plates each having a straight edge with the marginal portions of said plates along said straight edges being in lapping relation and oppositely directed laterally opening recesses formed in said edges with the inner end portions of said recesses being in registration to coact for forming the sides of a circular opening, the remaining outer edges of said plates being circular in linear contour about said opening as a center, said plates being generally horizontally disposed, but inclined downwardly in direction away from said opening with down turned flanges around said opening and downwardly extending rims along said outer circular edges, and means carried by said plates for releasably securing them against lateral separation from each other.

4. A sprinkler shield for a water sprinkler of the permanent type that is disposed in the ground with its upper side substantially flush with the upper surface of the ground comprising; a pair of identical plates each having a straight edge with the marginal portions of said plates along said straight edges being in lapping relation and oppositely directed laterally opening recesses formed in said edges with the inner end portions of said recesses being in registration to coact for forming the sides of a circular opening, the remaining outer edges of said plates being circular in linear contour about said opening as a center, said plates being generally horizontally disposed, but inclined downwardly in direction away from said opening with down turned flanges around said opening and downwardly extending rims along said outer circular edges, and means carried by said plates for releasably securing them against lateral separation from each other, said flanges around said opening being slanted toward the central vertical axis of said opening being slanted toward the central vertical axis of said opening and part of the said flange on one plate being in nested relation with part of the flange on the other plate.

References Cited in the file of this patent

UNITED STATES PATENTS

| | | |
|---|---|---|
| 1,379,233 | Wilcke | May 24, 1921 |
| 2,080,341 | Schumacher | May 11, 1937 |